United States Patent [19]

Sherer et al.

[11] 4,058,708
[45] Nov. 15, 1977

[54] BAR CODE READER AND DECODER

[75] Inventors: Paul Sherer, Costa Mesa; Gerald Paul Hester, Santa Ana, both of Calif.

[73] Assignee: MSI Data Corporation, Costa Mesa, Calif.

[21] Appl. No.: 638,056

[22] Filed: Dec. 5, 1975

[51] Int. Cl.² .......................................... H03K 21/36
[52] U.S. Cl. ...................... 235/92 CC; 235/92 MB; 235/92 PE; 235/92 DE; 235/92 R
[58] Field of Search ......... 235/92 R, 92 CC, 61.11 E, 235/92 PE, 92 DP, 92 MB, 92 DE, 150.53

[56] References Cited

U.S. PATENT DOCUMENTS

| | | | |
|---|---|---|---|
| 3,581,066 | 5/1971 | Maure et al. | 235/92 DE |
| 3,808,407 | 4/1974 | Ratz | 235/92 FQ |
| 3,824,378 | 7/1974 | Johnson et al. | 235/92 CC |
| 3,835,297 | 9/1974 | Inove | 235/61.11 E |
| 3,849,632 | 11/1974 | Eckert | 235/61.11 E |
| 3,866,024 | 2/1975 | Williams | 235/92 CC |

*Primary Examiner*—Joseph M. Thesz
*Attorney, Agent, or Firm*—Edward J. DaRin

[57] ABSTRACT

A bar code reader and decoder for reading and decoding linear bar coded information through the use of a logarithmic time base generator. The ratio of the widths of the coding segments are computed for decoding the bar coded data by utilizing a logarithmic time base generator for providing a logarithmic measure of the widths of preselected coding segments and accumulating the logarithmic timing signals in up/down counters to provide a logarithmic representation of the ratios of the widths of the segments. The resultant count of an up/down counter is applied to a translation table to provide a signal representative of equality in widths between compared coding segments or the relative widths in terms of greater than or less than in the direction of scanning.

21 Claims, 8 Drawing Figures

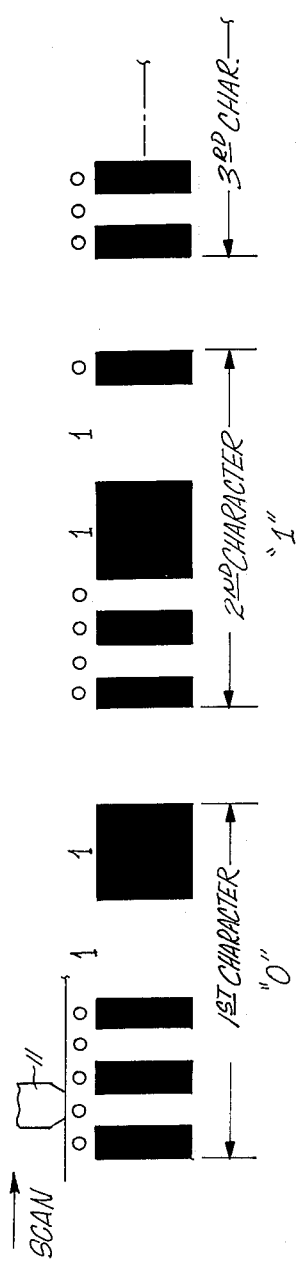

$R_1 = B_1/B_2$
$R_2 = S_1/S_2$
$R_3 = B_2/B_3$
$R_4 = S_2/S_3$
$R_5 = B_3/B_4$

| PERIOD COUNTER | $B_1$ | $S_1$ | $B_2$ | $S_2$ | $B_3$ | $S_3$ | $B_4$ |
|---|---|---|---|---|---|---|---|
| 23 | UP | HOLD | DOWN ($R_1$) | UP | HOLD | DOWN ($R_4$) | — |
| 24 | 0 | UP | HOLD | DOWN ($R_2$) | UP | HOLD | DOWN ($R_5$) |
| 25 | 0 | 0 | UP | HOLD | DOWN ($R_3$) | — | — |

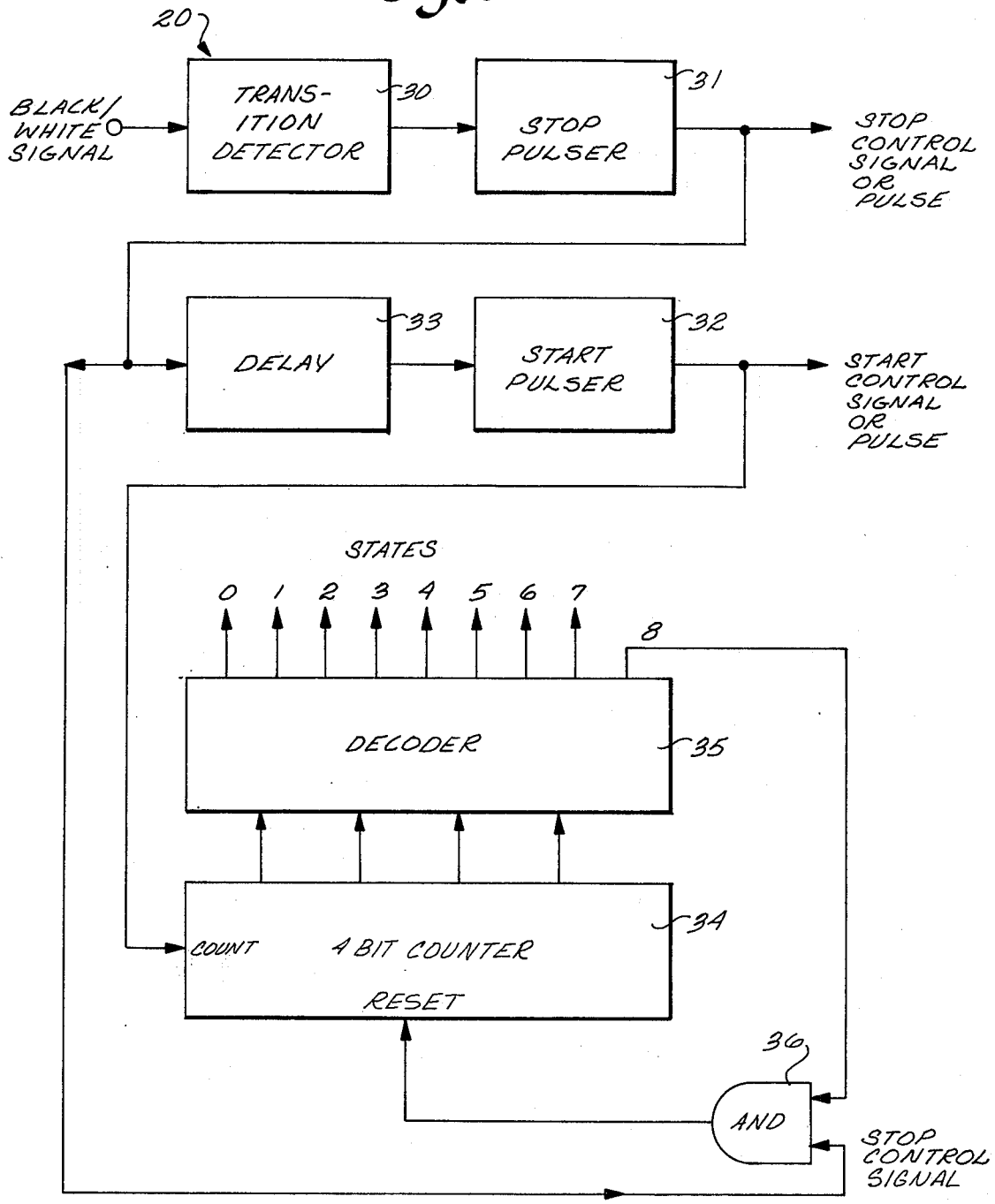

BAR CODE READER AND DECODER

DISCLOSURE OF THE INVENTION

This invention relates to a bar code reader and more particularly to a method and apparatus for reading a linear bar code based on the logarithmic time base for reading and decoding a linear bar code.

U.S. Pat. No. 3,771,132 discloses a portable, battery operated data collection system for collecting source data in retail outlets such as supermarkets, hardware stores, drug stores and the like for inventory control purposes. Portable optical scanners have been incorporated into such data collection systems. The optical scanners are employed for optically reading bar coded items, labels or the like for reading the data coded in terms of a bar code into the system thereby eliminating the need for operator entry of the source data into the collection system. The items are generally coded by means of known linear bar codes such as the Universal Product Code (UPC) or a 7-bit bar code known as a Codabar. These linear bar codes generally have a series of black bars or lines interleaved with white spaces of varying widths to represent intelligible information. One such optical scanner of wand for reading such a bar code is disclosed in the copending application bearing Ser. No. 454,585 and assigned to the same assignee as the present application, now U.S. Pat. No. 3,925,639. The intelligible information represented by a linear bar code is encoded by the ratios of the widths and the sequence of the black bars and white spaces. In a system of the type disclosed in the aforementioned copending application, the code is read by manually sweeping a wand across the entire bar coded portion of an item. The wand is provided with a narrow beamed light source and an optical sensor so that when it is in close proximity to a white space the light beam is reflected and absorbed by the optical sensor. If a dark bar is recorded on the coding surface, the light beam is absorbed by the bar. In this manner, an electronic signal will be generated by the optical sensor where the relative amplitudes are an indication of the reflectivity of the surface before the wand. The electronic signal from the sensor is an electronic analog of the dark bars and light spaces. The information in such a bar code is not contained in the magnitude of the signal levels but in the relative time duration maintained at each level and the particular sequence of these time durations or width ratios. To decode a bar code, these ratios must be measured with sufficient precision to accept a valid sequence and conversely, to reject the invalid one.

A widely employed technique for decoding a bar coded item is to measure time duration with electronic counters. A frequency source is gated to a counter during the period of a dark bar indication, for example, and then disconnected when a light space is encountered. The total count accumulated, then, is a digital representation of the time spent traversing that dark bar. Another counter is employed to accumulate the count for a subsequent bar. The contents of one counter is then divided into the other and the quotient represents their ratio. The frequency of the counting clock and therefore the resolution of the counters is determined by the accuracy required at the highest anticipated reading speed so that quantization errors will not cause decoding errors. Similarly, the capacity of the counters must be sufficient to accumulate the total count without overflow at the lowest anticipated reading speed. One such technique is disclosed in U.S. Pat. No. 3,784,792. To simplify this type of prior art technique for reading and decoding bar coded data and eliminating the complexities associated with division operations to provide the desired ratio of information, methods and devices employing logarithmic techniques have been developed. The use of logarithmic time base allows a division operation to be reduced to a simple subtraction and a multiplication operation to be performed by addition. One such bar coding technique employing a logarithmic time base is disclosed in U.S. Pat. No. 3,887,792. This prior art patent employs a logarithmic time generator of the type disclosed in U.S. Pat. No. 3,866,024. This prior art logarithmic bar code reader permits the same scanner to decode from a high speed laser beam or manually from a hand held wand. The technique disclosed in the latter mentioned two U.S. patents is a logarithmic technique but it is not smoothly logarithmic and the time generator developed forces the reader to use a logarithmic base of two.

The present invention provides an improved relatively inexpensive linear bar code reader and decoder based on logarithmic techniques that is readily and inexpensively incorporated into a portable source data collection system permitting lower power or battery consumption than heretofore thought possible by the use of prior art techniques. By tailoring the logarithmic base to the specific requirements of the system and implementing the timing clock interval in a microprocessor instruction memory, the present invention extends prior art concepts to new levels of efficiency. The efficiencies in implementation allow both lower costs and lower power consumption for portable data collection systems utilizing portable scanners. The efficiencies introduced by the present invention include the use of up/down binary counters for computing the ratio of the widths of the coding segments. This eliminates the need for sensing when the counter overflows or underflows for sign determination and reduces the storage capacity requirements to cover the range of ratios short of the full range of counts.

The concept of the present invention allows it to be integrated into a data collection system employing relatively slow, inexpensive microprocessors for manual scanning of the coded information or data. From an apparatus standpoint, the present invention comprehends apparatus for reading recorded data represented by patterns of a linear bar code which includes means for scanning the pattern of the linear bar code representing the recorded data and providing electrical signals representative thereof. Means are coupled to the pattern reading means for producing a stop control pulse in response to the scanning and the detection of a transition between code segments of the recorded data and a preselected interval thereafter producing a start control pulse. Logarithmic timing signal generator means which produces logarithmic time base signals is coupled to be responsive to the start and stop control pulses for respectively starting and stopping the time generator for each detected transition. Up/down counting means are provided for counting the timing signals generated between a start control pulse and a stop control pulse for a preselected pair of code segments and providing a resultant count representative of the ratio of the widths of preselected code segments. Means are coupled between the timing signal generator and the counting means to be responsive to the start-stop control pulses for controlling the coupling of the timing signals to the up/down counting means. Further means are provided for assigning a width ratio significance to the resultant count in the counting means to decode the scanned pattern of the bar code to its alphanumeric equivalent.

The apparatus for reading the recorded data includes a logarithmic timing signal generator for generating successive timing signals that are related with respect to a preselected logarithmic base. The timing signal generator comprises a binary counter for counting down preselected numbers preset into the counter and providing output signals therefrom at the same preselected count thereby generating the successive timing signals. Means are coupled to the binary down counter for responding to the output signals therefrom to enter a succession of preselected numbers into the binary down counter. The preselected numbers are selected on the basis of a predetermined logarithmic base so that the successive output signals and thereby the successive timing signals are logarithmically related. A pulse source is coupled to the binary counter for counting down the binary counter to the preselected count. The pulses from the pulse source are selected to occur at a continuous preselected rate.

These and other features of the present invention may be more fully appreciated when considered in the light of the following specification and drawings, in which:

FIG. 1 is a schematic representation of a bar coded label illustrating an optical reading wand coupled to a data collection system for reading the label data into the system;

FIG. 2 is a diagrammatic representation of a series of bar coded characters representing two coded characters as they may be recorded on the label of FIG. 1;

FIG. 3 is a diagrammatic representation of a sequence of a bar code for representing the decimal digit zero and the corresponding pattern of electrical signals that would be produced upon scanning the character. The sequence of assigned ratios for the bars and spaces for reading the decimal zero is illustrated for both a right to left and a left to right scan;

FIG. 5 is a block diagram of the sequence control element employed in the system of FIG. 4;

Figures 4, 4A:
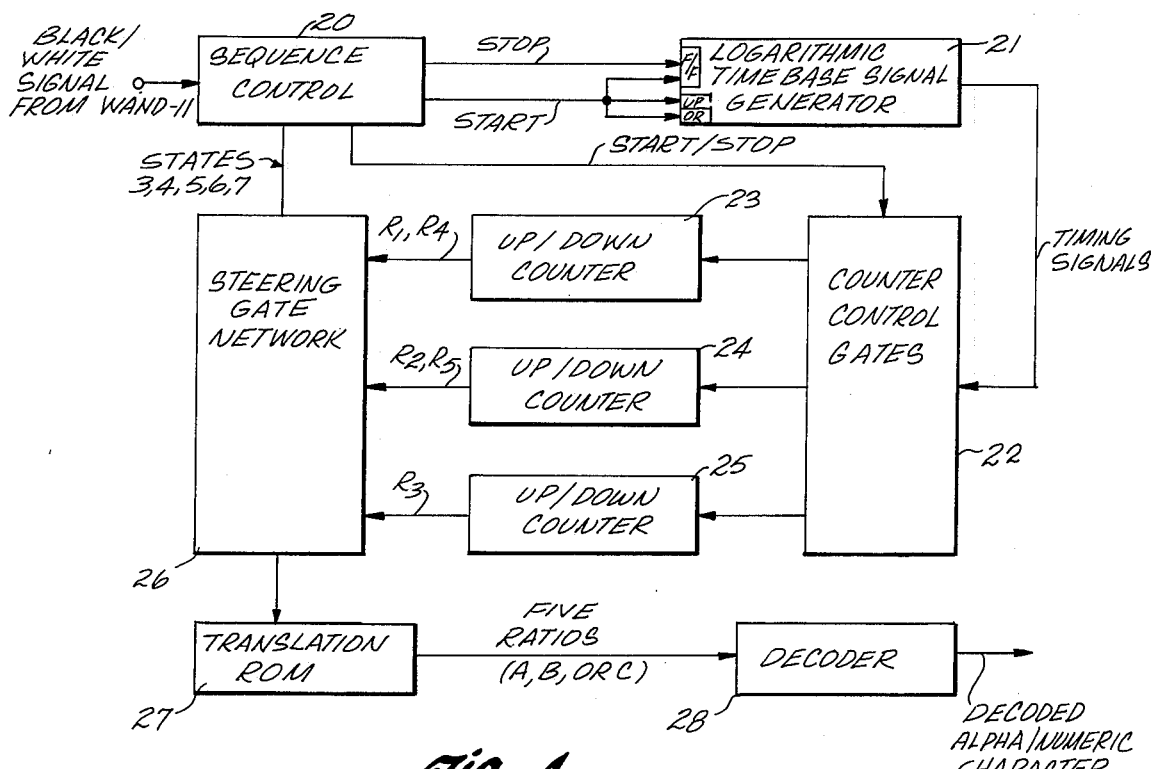
FIG. 4 is a block diagram of a ratio detecting system for detecting and decoding bar coded information and embodying the present invention.
FIG. 4A is a graphical illustration of a recording of the decimal digit zero in terms of a bar code and illustrating the ratios required for decoding the bar code and illustrating in table form the functions and results of the counters of FIG. 4.

The invention will now be disclosed in detail as the concept may be implemented for reading a linear bar code known in the art by the trademark "CODABAR". The Codabar bar code is a 7-bit code for representing alphanumeric information wherein the seven coding elements consist of four dark bars alternately separated by three white spaces as can be appreciated from examining Table I hereinbelow. In Table I the characters for the decimal digits 0-9 and certain preselected letters and symbols are represented with their Codabar set assignments.

TABLE I

| Number | 7-bit code | Bar pattern |
|---|---|---|
| 0 | 0000011 | |
| 1 | 0000110 | |
| 2 | 0001001 | |
| 3 | 1100000 | |
| 4 | 0010010 | |
| 5 | 1000010 | |
| 6 | 0100001 | |
| 7 | 0100100 | |
| 8 | 0110000 | |
| 9 | 1001000 | |

| Character | 7-bit code | Bar pattern |
|---|---|---|
| − | 0001100 | |
| $ | 0011000 | |
| : | 1000101 | |
| / | 1010001 | |
| . | 1010100 | |

TABLE I-continued

| Character | 7-bit code | Bar pattern |
|---|---|---|
| + | 0010101 | 0 0 1 0 1 0 1 |
| a | 0011010 | 0 0 1 1 0 1 0 |
| b | 0101001 | 0 1 0 1 0 0 1 |
| c | 0001011 | 0 0 0 1 0 1 1 |
| d | 0001110 | 0 0 0 1 1 1 0 |
| t | 0011010 | 0 0 1 1 0 1 0 |
| n | 0101001 | 0 1 0 1 0 0 1 |
| * | 0001011 | 0 0 0 1 0 1 1 |
| e | 0001110 | 0 0 0 1 1 1 0 |

The information in the above Codabar bar code is represented in the width relationships of the bars and spaces and their sequential arrangement to uniquely represent an alphanumeric character. A decoding alogarithm for the Codabar bar code is disclosed in detail in U.S. Pat. No. 3,784,792 and is only briefly summarized herein. Reference may be had to U.S. Pat. No. 3,784,792 for the details of the bar code.

Due to variable ink spread experienced in printing processes, width comparisons are made between a bar and an adjacent bar and between a space and an adjacent space for lower sensitivity to printing tolerances. This is not an inherent requirement for this invention but that sequence is assumed in the description of the invention.

When the width of two adjacent bars or spaces are divided, to determine their ratio, there are three possible relations (1) the first is less than the second (2) the first is greater than the second, and (3) the first is approximately equal to the second. These are referred to as relations A, B and C respectively in U.S. Pat. No. 3,784,792 as well as in this description. Referring to Table I for the Codabar symbol for the decimal digit zero, these relations are derived after the coded character is read from left to right (1, 2, 3 ...):

BAR1/BAR2 = C
BAR2/BAR3 = C
BAR3/BAR4 = A
SPACE1/SPACE 2 = C
SPACE2/SPACE 3 = A

Therefore, the numeral zero can be considered to be coded in terms of:

Bar sequence CCA and the
Space sequence CA
If the same symbol is read from right to left, the numeral zero is coded by:
Bar sequence BCC and the
Space sequence BC Once these width relation sequences have been recovered, the symbol can be translated into the equivalent character by means of a properly coded read-only memory, ROM, or programmed logic array, PLA. These can also reject invalid sequences. It is the principal object of this invention to only teach to detect the successive ratios between bars and spaces.

As described in U.S. Pat. No. 3,784,792, column 11, statements 16–18,

Relation A implies $t_n - 2 < t_n(1/K)$

Relation B implies $t_n - 2 > t_n(K)$

Relation C implies $t_n(K) > t_n - 2 > t_n(1/K)$ wherein
$t_n - 2$ is the traversal time of a bar or space preceding to the last to be measured
$t_n$ is the traversal time of the last bar or space
K is a constant which for Codabar is disclosed in said patent as 1.6.

The constant K is chosen to be an optimum decision threshold between wide-narrow and approximately equal ratios. For the purposes of this description this will be restated as follows:

Relation A implies $(B_{n-1}/B_n) < (1/1.6)$;

Relation B implies $(B_{n-1}/B_n) > (1.6)$; and

Relation C implies $(1/1.6) > (B_{n-1}/B_n) > (1.6)$ where $B_n$ is the previous bar width and
$B_{n-1}$ is the width of the bar preceding the previous bar. For clarity and brevity in describing this invention, only bars will be discussed, although the statements apply to spaces also. Finally, if the following logarithmic expression is examined to determine the width ratios of the coding segments $$LOG (B_{n-1}/B_n) = LOG\ B_{n-1} - LOG\ B_n$$

Then, if the logarithms of the widths are used, the ratio can be found by subtraction. No multiplication or division is necessary. The values accumulated for $B_n$ and $B_{n-1}$ could be used to address a table where the logarithms of the values are stored. However, this still requires accumulation of a large range of values and a large table. It would be more efficient to measure the logarithm of the traversal time of the bars. This could be accomplished directly if the clock used to measure traversal time exhibits a logarithmic progression, such as:

$$t_n = T_o J^n\ or\ LOG_J\left(\frac{t_n}{T_o}\right) = N$$

This logarithmic progression states that the elapsed time represented by $t_n$ is the first clock interval $T_o$ times J raised to the Nth power. This can be visualized if the logarithmic base J = 2 and the first time period $T_o$ = 1 second as noted in Table II below:

TABLE II

| N | 0 | 1 | 2 | 3 | 4 | 5 | 6 | 7 |
|---|---|---|---|---|---|---|---|---|
| $t_n$ (sec) | 1 | 2 | 4 | 8 | 16 | 32 | 64 | 128 | wherein values of $t_n = T_o J^n$, $T_o = 1$, $J = 2$

If $t_{n2}/t_{n1} = 2$ then $N_2 - N_1 = 1$ regardless of whether $t_{n2}$ were 4 seconds or 128 seconds.

The task now is to select a value for J that is appropriate to the desired resolution and required number of ratios. This can be accomplished by first determining the number of states per ratio required to provide the desired resolution. Since the states (numbers) are a quantized representation of the ratio, there is a quantization error. If there were only one state per ratio, the actual ratio would be known only within ± 50 percent of its true value. The number of states required is the reciprocal of twice the quantization error. Then, if the ratios are regular, the total number of states required is the product of the number of states per ratio and the total number of ratios. The base 2 logarithm of that number gives the number of binary bits required to represent all states.

Once the number of states is known, the base of the logarithmic clock can be determined. When this number J is raised to the power that is the boundary between ratios, it should equal the decision threshold between those ratios. This determination can be made by the following procedure:

Take the reciprocal of the total spread of the desired quantization error (resolution). The result is the number of states required to represent each ratio. This number times the number of distinct ratios gives the total number of states required. Take the base 2 logarithm of that number and round off to the next higher integer. This is the number of binary bits required to represent all ratios. To complete the logarithm base J, raise the decision threshold K to the reciprocal of ½ the states per ratio SR power.

$$J = 1/(SR/2)$$

For example, if the Codabar bar code were to be represented with a quantization error of ± 10 percent, the determination is made by the following:

States per ratio = $1/(0.1 + 0.1) = 5$

Total states required = $5 \times 3 = 15$ $LOG_2(15) = 3.91$, all ratios can be represented by 4 binary bits.

The count clock logarithm base, $J = (1.6)^{1/2.5} = 1.2068$

If the value for a narrow bar is subtracted from the value for a wide bar, the result is positive. In the converse case, the result is negative. The four binary bit representation in this case must represent bipolar values. If the ratio is computed by counting a 4-bit binary counter up during the first bar and down during the second bar, the counter would underflow with a narrow to wide sequence. For example, if the counter started from zero, counted up 5 and then down 7, the result in the counter would be 14(1110). Table III shows all states of a 4-bit binary counter but shifted so that the digit zero is centered. The upper row I of Table III lists the binary counter states, the second row II represents the numeric results, N, of ratio computations, the third row III is the actual ratios the values represent for the conditions selected above, and the fourth row IV is the width relations A, B or C assigned to the ratios and counter states. It should be noted that relation B has six values while the other two have only five. The reason for this will be described below:

TABLE III

| I | 1001 | 1010 | 1011 | 1100 | 1101 | 1110 | 1111 | 0000 | 0001 | 0010 | 0011 | 0100 | 0101 | 0110 | 0111 | 1000 |
|---|------|------|------|------|------|------|------|------|------|------|------|------|------|------|------|------|
| II | −7 | −6 | −5 | −4 | −3 | −2 | −1 | 0 | 1 | 2 | 3 | 4 | 5 | 6 | 7 | 8 |
| III | $\frac{1}{3.73}$ | $\frac{1}{3.09}$ | $\frac{1}{2.56}$ | $\frac{1}{2.12}$ | $\frac{1}{1.76}$ | $\frac{1}{1.46}$ | $\frac{1}{1.2068}$ | 1 | 1.2068 | 1.46 | 1.76 | 2.12 | 2.56 | 3.09 | 3.73 | 4.5 |
| IV | ←——A——→ | | | | | | | ←——C——→ | | | ←——B——→ | | | | | |

Now a value must be assigned to $T_o$. To make this determination let $B_1$ equal the traversal time of a first bar and $B_2$ the traversal time of a second bar and $J = 1.2068$. Then:

$$LOG_J \frac{B_1}{T_o} = N_1, \quad LOG_J \frac{B_2}{T_o} = N_2$$

$$N_1 - N_2 = LOG_J \frac{B_1}{T_o} - LOG \frac{B_2}{T_o} =$$

$$LOG_J \left( \frac{B_1}{T_o} \cdot \frac{T_o}{B_2} \right) = LOG_J \frac{B_1}{B_2}$$

which states that the value for $T_o$ does not affect the result for the ratio. This is a result only for a logarithmic relation and would not hold true for a linear relation.

In the simplest microprocessor system there is only one central processing unit so that it can perform only one task at a time. If it is used to generate a logarithmic time base, it would have to abandon that task briefly at every transition from bar to space or space to bar to process and store results. Thus it is highly desirable to have a fixed delay ($T_o$) before the logarithmic count begins. The value for $T_o$ is determined by dividing the narrowest bar or space by the highest reading speed. For example, if the narrowest bar is 0.006 inch and the highest reading speed is 30 inches per second, $T_o$ is 200 microseconds, which is assigned a logarithmic count of zero. Now the clock intervals can be computed by the equation:

$$t_n = (200 \times 10^{-6})(1.2068)^N$$

Table IV lists the results out to 15 milliseconds. Note that 200 microseconds is available after every transition for housekeeping chores which is adequate for even relatively slow present day microprocessors.

TABLE IV

| N | $200(1.2068)^N$ | N | $200(1.2068)^N$ |
|---|---|---|---|
| 0 | 200 microsec. | 12 | 1,910 |
| 1 | 240 | 13 | 2,300 |
| 2 | 290 | 14 | 2,780 |
| 3 | 350 | 15 | 3,360 |
| 4 | 420 | 16 | 4,050 |
| 5 | 510 | 17 | 4,890 |
| 6 | 620 | 18 | 5,900 |
| 7 | 750 | 19 | 7,120 |
| 8 | 900 | 20 | 8,590 |
| 9 | 1,090 | 21 | 10,370 |

TABLE IV-continued

| N | $200(1.2068)^N$ | N | $200(1.2068)^N$ |
|---|---|---|---|
| 10 | 1,310 | 22 | 12,510 |
| 11 | 1,580 | 23 | 15,100 |

Logarithmic clock times (rounded to nearest 10 microseconds)

Consider the case where a wide bar 2.56 times the width of a narrow bar precedes the narrow bar and the wand is moving at maximum speed. A counter is incremented during the first bar and decremented during the second. It is counted up 5 and down 0 with the correct result of 5; see Tables III and IV. Now, if the reading speed is one tenth the maximum there will be 17 up counts and 12 down counts; Table IV. Although this exceeds the counter capacity, the result is still correct. This means that the counter must include the range of ratios to be encountered but need not contain the total range of counts, i.e., overflows and underflows can be ignored.

During the reading of the first part of a bar code, the wand will typically be accelerating but decelerations are small. During acceleration, bars and spaces are traversed in successively shorter periods of time. Consider the previous case where a wide bar is traversed in 5 milliseconds for a count of 17, but the wand is accelerating. Now, due to acceleration, suppose that the narrow bar accumulates a count of 9 instead of 12. This would be very high acceleration, but when print tolerances are considered, it is feasible. The result would be 1000 (8) which in Table III produces the correct result of relation B. However, 8 is an extra value which could be assigned to the left side of Table III as an A relation with a ratio of 1/4.5. If it were, the above situation would produce an incorrect result. It is therefore assigned to an additional B ratio to provide better tolerance to acceleration.

While the ratios can be most easily computed by up/down counting, if there are more than one pair of ratios, there must be simultaneous up/down counting. To properly decode a Codabar symbol, five ratios must be computed for each coded symbol, one such group of five ratios is as follows:

Ratio 1 = $Bar_1/Bar_2$

Ratio 2 = $Space_1/Space_2$

Ratio 3 = $Bar_2/Bar_3$

Ratio 4 = $Space_2/Space_3$

Ratio 5 = $Bar_3/Bar_4$ all further identified in FIG. 4A for the Codabar representation for the decimal digit zero. It will be recognized, as noted hereinabove that other ratios may be selected for this purpose. This computation of the five ratios requires a minimum of three counters as illustrated in FIG. 4 and their sequence of operation and the ratios resulting are illustrated in FIG. 4A and will be described in more detail hereinafter.

In a microprocessor, these counters may be index registers or memory locations, depending on its architecture. The actual counting may be done in an accumulator and stored in appropriate registers. Programmable delays may be efficiently implemented in program storage for a microprocessor. Microprocessors are presently employed in commercially available, portable, data collection systems. One such system is the MSI Model 2100 data collection system and which system incorporates an optical wand for reading bar coded data into the system all as more fully described in the above identified copending application bearing Ser. No. 454,585, now U.S. Pat. No. 3,925,639.

With the above concepts in mind, the implementation of the concepts of the present invention can be examined with reference to the drawings. In FIG. 1, a portable data collection system 10 is diagrammatically represented in block form with a manually operated wand 11 employed for reading the data from a bar coded label 12 into the data collection system. The data collection system, in this instance, includes a microprocessor 10P for receiving the signals from the wand 11 which are produced upon the production of relative motion between the wand 11 and the label 12 for reading the bar coded label 12. The bar code label 12 is illustrated as including two complete characters and a portion of a third character arranged in longitudinal alignment on the label 12. The bar code may be the Codabar linear bar code having 7 binary bits for representing an alphanumeric character. For this purpose, the wand 11 may be an optical wand that may be manually passed over a stationary bar coded label 12 for providing the relative motion between the wand 11 and the label 12 for producing the desired signals for decoding the bar code data into intelligible information for processing in the system 10. The portions of words that may be coded on the label 12 in terms of the Codabar bar code are illustrated in FIG. 2. In exemplary form, the first two characters of a word that are recorded in terms of the Codabar code are the decimal digits 0 and 1 respectively reproduced in FIG. 2 in terms of the alternate arrangement of black bars and white spaces. In reading the binary patterns representing the binary characters and comparing the set of binary characters with those of Table I, it will be seen that the first two characters on the label 12 do in fact represent the decimal digits 0 and 1, as illustrated. The output signals from the wand 11 that are coupled to the data collection system 10 are the analog representations of the bar coded information.

A typical series of electrical signals that may be produced by the wand 11 are represented in FIG. 3. In FIG. 3 the decimal digit zero is represented in terms of its Codabar representation along with the output signals that are derived from passing the wand over the portion of the label that represents the decimal digit zero. The coding segments of the bar code for the decimal digit zero illustrated in FIG. 3 are illustrated as bars 1, 2, 3 and 4 arranged alternately with spaces 1, 2 and 3. The corresponding electrical output signals from the wand 11 are illustrated immediately below the bars and spaces and identified by bars $B_1$, $B_2$, etc. and spaces $S_1$, $S_2$, etc. The analog equivalent of the information recorded on a label is processed in accordance with the present invention to derive the information represented by the bars and spaces by detecting the relative widths of the bars and spaces for a character and their unique sequences. For this purpose, as noted hereinabove, the comparison of the widths of a pair of bars or spaces will be considered as falling within one of the three different ratio relationships. The bar or space coding segments that are compared with the next sequential segment will be either equivalent in width or one will be greater than the other. These relationships as defined above, are identified as the ratio relationships A, B, and C. The sequential arrangement of five assigned ratios A, B and C for the 7 binary coding segments will be employed for finally decoding a character into its equivalent alphanumeric character as illustrated in Table I. The sequence of the resulting assigned ratio relationships or the resulting assigned ratios A, B and C depend on the direction a character is read, i.e., from right to left or left to right. FIG. 3 illustrates the two sequences of the ratios A, B and C for the decimal digit zero that would result in reading in both directions. If the bar coded information is read from left to right, it may be noted that in comparing bar 1 with bar 2 and space 1 with space 2 and bar 2 with bar 3, etc., and space 2 with space 3, that the resulting sequence evolves itself into the sequence CCA for the bars and CA for the spaces when reading from left to right. From this, it will be recalled that the symbol C represents that the two compared coding segments are equal. In reviewing the bar sequence it can be visually observed that this is true since bars $B_1$ and $B_2$ and $B_3$ are equal. Similarly, ratio assignment A indicates that $B_4$ is wider than $B_3$. With the same logic, the assigned ratios for the sequence of the spaces evolved into CA which indicates with regard to the assigned ratio C that the spaces $S_1$ and $S_2$ are equal, while the space $S_3$ is greater than the space $S_2$ as a result of assigning the ratio A to these coding segments. In visually comparing these assigned ratios for the spaces recorded in FIG. 3, it will be concluded that the correct results will be detected in following this logic.

Similarly, the same logic applies when the bar coded information is read from right to left as noted in FIG. 3. The same width relationships apply except now that the inverse relationship exists between a pair of segments wherein one segment is wider than the other. For example, with regard to the bar sequence, it will be noted that the assigned ratio B signifies that $B_4$ is greater than $B_3$ which is the correct relationship as recorded. The C relationship is the same for both directions of scanning.

With this specific logic in mind and with reference to FIG. 4, the general organization of a hardware embodiment for implementing this concept for detecting the ratios between coding segments will now be examined. FIG. 4 illustrates a block diagram of a ratio detecting system for detecting the ratios between successive preselected coding segments through the use of a logarithmic time base generator. The input signal to such a ratio detecting system is the black/white analog signal from the wand 11 of the type illustrated in FIG. 3. The signal from the wand 11 is coupled to a sequence control element 20 which is effective for producing a stop control signal or pulse in response to the detection of a transition from one type of coding segment to the other type of segment or from the transition between a bar and a space or from a space to a bar. The sequence control output signal also provides a start control signal or pulse at a preselected time interval after the generation of a stop control signal. These stop-start control signals are utilized to control the operation of the ratio detecting system illustrated in FIG. 4. Specifically, the start-stop signals are employed to include the control of the generation of timing signals from a logarithmic time base signal generator 21. The start-stop control signals are also utilized in combination with the timing signals provided by the logarithmic time base time signal generator 21 for controlling the coupling of the output signals from a counter control gate network 22. The counter control network 22 controls the coupling of the timing signals from the generator 21 to one of the three up/down counters 23, 24 and 25 arranged at the output of the control gates 22 to receive the pulses to be counted therefrom. The counter control gates 22 control which of the up/down counters 23, 24 or 25 will receive the timing signals from the logarithmic time base generator 21 and control whether the counters will be counted up or down, whether a count will be held in a particular counter, or whether a counter will be reset.

The timing signals from the logarithmic time base signal generator 21 are generated during the time interval between the reception of a start pulse at the generator 21 and a successive stop pulse. Since the start-stop pulses are generated in response to the detection of a transition from one type of coding segment to the next, the number of timing signals generated during any one interval represents a measure of the width of a particular coding segment as scanned or read by the wand 11. The number of timing signals for a pair of coding segments can be employed to determine their relative widths by entering these timing signals into the same counter. The final count of the counter will produce a final result or count which will represent the ratio of the widths of two segments in accordance with the logic described hereinabove with reference to Table III. The resulting count from each counter 23, 24 and 25 will be then coupled under the control of a steering gate network 26 to a translation element or read only memory (ROM) 27. The steering gate network 26 is coupled to be responsive to preselected states provided from the sequence control element 20 for steering the final count from any one of the counters at preselected intervals to the translation element 27. The translation element 27 will assign one of the ratios A, B or C in accordance with the assignments of Table III to the resulting count from an up/down counter for decoding the particular character scanned by the wand 11. For this purpose the five ratios in terms of the ratio assignments A, B or C are assigned to the resultant count from the counters 23, 24 and 25 and are applied to a decoder 28 illustrated in FIG. 4 in block form. The decoder 28 will be responsive to the five ratios to produce at its output a signal respresentative of the decoded alphanumeric character.

With this general arrangement of the ratio detector in mind, the details of the elements comprising the ratio detector such as the sequence control element 20, the time base generator 21 and the controlled operation of the up/down counters 23, 24 and 25 can be examined in more detail. Referring to FIG. 5 in particular, the implementation of the sequencing control element 20 will be first examined. The sequencing control element 20 comprises a transition detector 30 for responding to the detected transitions between the different kinds of coding segments noted hereinabove. For this purpose the transition detector 30 is coupled to a pulser 31 for producing a stop control signal or pulse in response to the detection of a transition between a coding segment of one kind to a coding segment of the other kind. The output of the pulser element 31 is also coupled to a second pulser 32 through a delay network 33. The stop pulses generated from the pulser 31 will be produced at the output of the pulser 32 at a preselected time interval after the generation of the stop pulse and this pulse is identified as the start pulse or start control signal in FIG. 5. The start pulses are utilized to count up a 4-bit binary counter 34. The output, then, of the pulser 32 is applied directly to the count input of the 4-bit counter 34 for counting the pulses generated at the pulser 32. The output signals from the 4-bit counter 34 produces a plurality of binary states representative of the count accumulated therein. The states of the counter 34 are decoded to identify the count through a decoding network 35 coupled to be responsive to the binary states thereby producing nine output signals respresentative thereof. The outputs of the decoder 35, for this purpose, are identified as the states 0–8 in FIG. 5. Eight states are selected from the counter 34 for controlling the reading of the 7 coding segments of the bar code with the ninth state being utilized for resetting the counter 34 for the next reading operation. For this purpose an AND gate 36 is provided and is coupled to a reset input terminal of the counter 34. The AND gate 36 is a two input gate and is coupled to be responsive to the "8" output of the decoder 35 as one input signal thereto. The other input to the AND gate 36 is coupled to receive the stop pulses or stop control signals directly from the pulser 31.

From the above description, the operation of the sequencing control element 20 can be examined in more detail. It will be noted that if the Codabar decimal digit zero is recorded on the label 12, 7 bits or 7 coding segments are recorded on the label 12. Accordingly, eight transitions will be detected in reading a coding segment as should be evident from examining FIG. 3. At every transition from a black bar to a white space or from a white space to a black bar, the stop pulse will be emitted from the pulser 31. After a preselected short time delay provided by the delay element 31, a start pulse will be emitted from the start pulser 32. Every start pulse is counted by the counter 34 and at every count a correspondingly different state is signalled from the decoder 35. The states are identified as 0–8 reading from left to right and correspond to counting up from zero to eight. The states 0–7 from the decoder 35 are utilized to control the coupling of the resultant counts from the up/down counters 23, 24 and 25 to the translation element 27. During the 9th state or the state identified as state 8 in FIG. 5, the wand 11 is located in the gap between recorded information or between characters which can be appreciated from examining FIG. 2. During the interval that the wand 11 is in the intercharacter gap and the decoder 35 signals the 8th state, the counter 34 will be reset to zero when the leading edge of the first bar of the next character (the second character in FIG. 2) is detected by the transition detector 30. Specifically, during the time interval illustrated in FIG. 2 when the wand 11 is going from the last black bar of the first character, the counter 34 has counted all the transitions and decoder 35 signals the 9th state or "8". The wand 11 continues in this "gap" towards the first black bar for the second recorder character. With the detection of the transition from the intercharacter gap to the black bar for the second character, a stop pulse will be generated by the pulser 31 for satisfying the input conditions to the AND gate 36 to thereby reset the counter 34 to count 0 and allow the next character (i.e. the second) to be decoded while the decoder 35 signals the "0" state.

Now considering the application of the control signals from the sequence control element 20 to the counter control gate network 22, their logical combination with the logarithmic time base signals from the generator 21 for controlling the up/down counters 23, 24 and 25 can be better appreciated with reference to FIG. 4 and Table V.

TABLE V

| States or Decoder 35 | Pulse | Counter 23 | Counter 24 | Counter 25 | Element 27 Translation |
|---|---|---|---|---|---|
| 0 | Stop | Reset | Reset | Reset | — |
| 1 | Start | Count Up | — | — | — |
| 1 | Stop | Hold | — | — | — |
| 2 | Start | Hold | Count Up | — | — |
| 2 | Stop | Hold | Hold | — | — |
| 3 | Start | Count Down | Hold | Count Up | — |
| 3 | Stop | Hold Reset | Hold | Hold | Translate $B_1/B_2$ |
| 4 | Start | Count Up | Count Down | Hold | — |
| 4 | Stop | Hold | Hold Reset | Hold | Translate $S_1/S_2$ |
| 5 | Start | Hold | Count Up | Count Down | — |
| 5 | Stop | Hold | Count Up | Hold | Translate $B_2/B_3$ |
| 6 | Start | Count Down | Hold | — | — |
| 6 | Stop | Hold | Hold | — | Translate $S_2/S_3$ |
| 7 | Start | — | Count Down | — | — |
| 7 | Stop | — | Hold | — | Translate $B_3/B_4$ |
| 8 | Start | Intercharacter Gap | | | |

The functions and the results of the up/down counters 23, 24 and 25 are illustrated in FIG. 4A for providing the typical ratio detection for each of the segments for representing the Codabar equivalent of a decimal digit (in this instance zero). In FIG. 4A the coding segments selected for comparison as to their relative widths are the successive bars while the successive spaces are compared. As also noted in FIG. 4A, the ratio of the bars $B_1$ and $B_2$, reading from left to right, is identified as ratio $R_1$. Similarly, the ratios for the bars $B_2$ to $B_3$ and $B_3$ to $B_4$ are identified by the respective ratios $R_3$ and $R_5$. The ratio of the sequential spaces are identified by the ratios $R_2$ and $R_4$ further identified in FIG. 4A.

In reading the recorded characters from left to right, and upon detecting the leading edge of the first bar or bar $B_1$ for this character, the timing generator 21 will be started in response to a start signal from the pulser 32 of sequence control element 20. This will activate the logarithmic time base generator 21 for generating a number of timing signals until the space $S_1$ is detected. During the interval that the timing signals are generated they will be applied to the up/down counter 23 to count it up. The timing signals corresponding to bar $B_1$ will count up the counter 23, while the up/down counters 24 and 25 will be maintained in their reset or zero state; see FIG. 4A, period $B_1$. During this same time interval, after the leading edge of bar $B_1$ has been detected, the STOP pulse will reset the counter 34 of the sequence control element 20 to the zero state. When space $S_1$ is detected, the timing signals corresponding to its width are generated by generator 21 and at this time the counters will be controlled so that these timing signals are applied to count up the up/down counter 24. This occurs during the state of decoder 35 noted in Table V as State 2 — Start. During this time period $S_1$, the count representing bar $B_1$ is maintained in counter 23, while up/down counter 25 is maintained in its reset or 0 state. During the next time period, bar $B_2$ is scanned and the timing signals corresponding to this bar are also applied to counter 23. In this instance the timing signals representing bar $B_2$ are applied to count down up/down counter 23. During this count down time interval, the count is maintained in counter 24 while the same number of $B_2$ timing signals are also applied to count up counter 25. When the wand 11 moves from $B_2$ into space $S_2$ the computation of the ratios between bars $B_1$ and $B_2$ will have been computed and will be represented by the count residing in up/down counter 23 at that time. This result is represented in FIG. 4A as $R_1$, which represents the ratio between these two bars and corresponds to State 3 Stop in Table V. During this interval the output of counter 23 represented by $R_1$ will be coupled to the translation memory element 27 in response to the state 3 signal from sequence element 20 to translate this final count into an assigned ratio. In this instance, since the bars $B_1$ and $B_2$ are equal, the assigned ratio for this comparison will be C and the output signal from element 27 will be representative thereof.

During the next time interval, in going from bar $B_2$ to space $S_2$ the logarithmic timing signals for defining the width of space $S_2$ will be applied to counters 23 and 24. The timing signals applied to counter 24 will count down this counter, while the signals applied to counter 23 will count up this count. As noted in Table V, at State 4 Start, before counter 23 is counted up it will be reset to erase the final result $R_1$ residing in this counter as the result of having applied the signals representing bars $B_1$ and $B_2$ previously. The timing signals applied to counter 24 are now subtracted from those previously entered representing space 1 or $S_1$. The count in up/down counter 25 will be maintained during the interval that space $S_2$ is being read. At the end of the time interval that the space $S_2$ is being read (State 4 Stop), the counter 24 will have a final count representing the subtraction and thereby the computation of the ratio between space $S_1$ and $S_2$, $R_2$. Accordingly, with the application of the state 4 to the steering gate network 26, the final count $R_2$ will be applied to the translate memory element 27 to have the ratio assigned thereto. In the same fashion, segments $B_3$, $S_3$ and $B_4$ will cause timing signals to be generated and counted in each of the counters 23, 24 and 25 in accordance with the logic illustrated in FIG. 4A and Table V. From this it will be appreciated that at the completion of the reading of bar $B_3$, the ratio $R_3$ will be provided at the output of counter 25, while ratio $R_4$ will be provided at counter 23 at the end of sensing space $S_3$, with the fifth and last ratio $R_5$ being produced at counter 24 after the fourth bar is sensed. When states 5, 6 and 7 are generated at decoder 35, it will cause these ratios $R_3$, $R_4$ and $R_5$ to be coupled to the translate memory element 27 where ratio assignments will be made. It should be appreciated that the resultant count of an up/down counter representing one of the ratios $R_1$, $R_2$, $R_3$, etc. is the number that represents the logarithm of the difference between the accumulated timing signals. No anti-logarithm need be directly produced since the resultant number is employed with a translation table in the form of the memory element 27 to assign the desired one of the three ratios thereto. In this fashion, when the five ratios have been assigned to the final result of counters 23, 24 and 25, the five entries can be utilized by the decoding element 28 for producing the decoded alphanumeric character to be employed in the data collection system 10. Each of the aforementioned functions of the counters 23, 24 and 25 and nine states of the decoder 35 in relation to the stop/start pulses are detailed in Table V hereinabove.

The counter control gates 22 and steering gate network 26 are illustrated in block form and described in terms of their function. It will be evident to those skilled in the art that with the logic described including the disclosure in FIG. 4A and Table V that any logic designer could readily provide the detailed gating network for steering the timing signals to the correct up/down counter for providing the indicated counting sequences. Similarly, the steering gate network 26 can be readily provided to "logically" combine the signals representative of the state of the counter 35 illustrated in FIG. 4 (i.e. states 3, 4, 5, 6 and 7) with the corresponding resultant count from the correct up/down counter 23, 24 or 25 to couple the resultant count to the translation device illustrated in FIG. 4 as the translation ROM 27.

Figure 6:
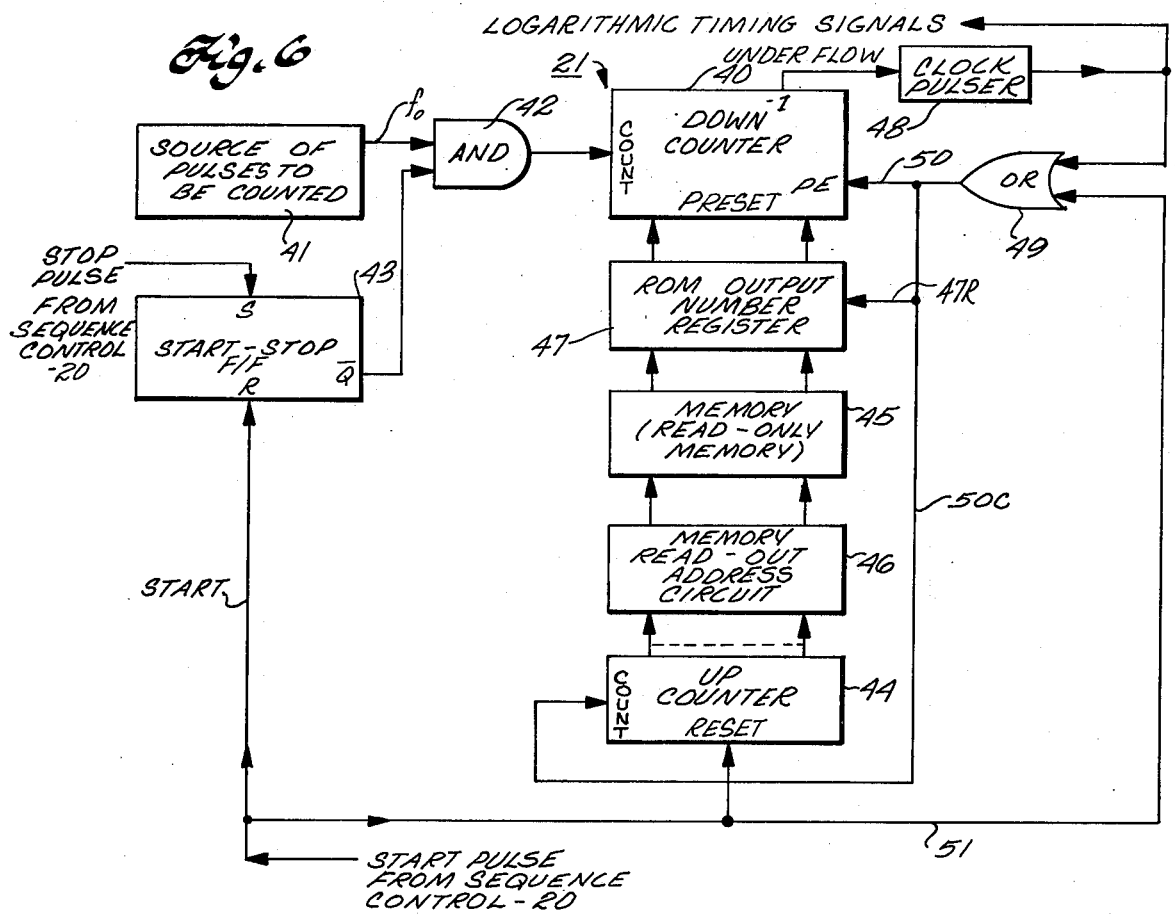
FIG. 6 is a block diagram of a logarithmic time base generator employed in the system of FIG. 4 and embodying the present invention.

Now referring to FIG. 6, the implementation of a logarithmic time base generator 21 in accordance with the present invention will be examined. It should be recognized that the logarithmic time base generator 21 will generate timing signals that are not restricted to any one logarithmic base but related on the basis of any preselected logarithmic base. The logarithmic base in accordance with the bar reading concepts of the present invention is selected in accordance with the resolution requirements and required number of ratios for the coding segments of the bar coded data. For this purpose, the logarithmic timing base signal generator 21 comprises a down counter 40 arranged to be counted down through the provision of pulses to be counted provided by a pulse source 41. The pulse source 41 continuously provides pulses to be counted occurring at a preselected repetition rate or rate $f_o$. The pulses in this instance are selected to occur at 10 microsecond intervals. The output pulses from the source 41 are applied as one input signal to an AND gate 42. The AND gate 42 has its output terminal connected to the count input terminal for the down counter 40. The other input to the AND gate 42 is coupled to the $\bar{Q}$ output of a start/stop flip flop 43. The stop/start flip flop 43 has its set or S input terminal coupled to be responsive to the stop pulses from the sequence control element 20. The reset input or the R input to the flip flop 43 is coupled to be responsive to the Start pulses from the sequence control element 20. The down counter 40 is controlled through the provision of means for transferring preset numbers or counters thereto to be utilized for generating the logarithmic timing signals for clock pulses. For this purpose an up counter 44 and a memory element 45 may be provided. The up counter 44 is a binary counter that has its output states decoded and arranged for addressing a read only memory element 45. For this purpose a read out address circuit 46 is arranged intermediate the counter 44 and the input to the memory 45. The memory 45 may be a read only memory that has preselected counts recorded therein to be entered into the down counter 40 in a preselected sequence. The preselected counts have been selected on the basis of the logarithmic base selected for the system as described hereinabove.

TABLE VI

| Up Counter 44 | Preset No. | Cumulative Counts of Counter 40 |
|---|---|---|
| (N) 0 | 19 | 20 |
| 1 | 3 | 24 |
| 2 | 4 | 29 |
| 3 | 5 | 35 |
| 4 | 6 | 42 |
| 5 | 8 | 51 |
| 6 | 10 | 62 |
| 7 | 12 | 75 |
| 8 | 14 | 90 |
| 9 | 18 | 109 |
| 10 | 21 | 131 |

TABLE VI-continued

| Up Counter 44 | Preset No. | Cumulative Counts of Counter 40 |
|---|---|---|
| 11 | 26 | 158 |
| 12 | 32 | 191 |
| 13 | 38 | 230 |
| 14 | 47 | 278 |
| 15 | 57 | 336 |
| 16 | 68 | 405 |
| 17 | 83 | 489 |
| 18 | 100 | 590 |
| 19 | 121 | 712 |
| 20 | 146 | 859 |
| 21 | 177 | 1,037 |
| 22 | 213 | 1,251 |
| 23 | 258 | 1,510 |

Specifically, the preset numbers stored in the memory 45 and sequentially entered into the down counter 40 are identified in Table VI in the column "Preset No.". They are entered into the counter 40 in sequential fashion as recorded in Table VI and in accordance with the count of the up counter 44 identified in the Table. Accordingly, with the counting up of counter 44 an address is provided at the address circuit element 46 for reading out the preset numbers from the memory 45 into a memory output register 47. The memory output registers 47 will store the numbers read out from the memory 45 until the parallel entry terminal PE of the down counter 40 is activated. The activation of the PE terminal will cause the numbers stored in the memory read out register 47 to be entered in parallel circuit fashion into the down counter 40 in preparation for the generation of the next succeeding timing output pulse.

An underflow output terminal −1 is provided from the down counter 40 and is coupled to a clock pulser element 48. With the activation of the −1 counter terminal, the pulser 48 will provide an output signal or pulse therefrom. These output signals are considered to be the logarithmic timing signals or clock pulses from the generator 21. With a 10 microsecond pulse rate for the source 41, the pulses will occur at the time intervals noted in Table IV hereinabove. The output pulses from pulser 48 are also applied to an OR gate 49 as one input signal thereto. The output pulse from the OR gate 48 is applied as the input signal for activating the parallel entry terminal, PE, of the down counter 40 through the lead wire 50. The same output signal is applied to the read out register 47 for reading out the numbers stored therein into the down counter 40 with the activation of the counter's PE terminal. Similarly, by means of lead wire 50C, the output of the OR gate 49 is applied to the count input terminal of the up counter 44. This will cause the up counter 44 to be counted up one count in response to each output pulse generated by the down counter 40. The remaining input pulse to the OR gate 49 is the start pulse derived from the sequencing control element 20. This start pulse is applied to the OR gate 49 by means of the lead wire 51 and is simultaneously applied to the reset input terminal of the up counter 44 for resetting it to the zero state and to the reset or R terminal of the start-stop flip flop 43.

Before considering the operation of the logarithmic time base signal generator 21 in detail it is well to examine the numbers that are preset into the down counter 40 for producing the desired output signals. The numbers may be advantageously stored in a read only memory, such as the memory 45 illustrated in FIG. 6A, of a microprocessor. The intervals of arbitrary duration that are generated by the logarithmic time base generator 21 can be generated by the pattern of numbers selected for the read-out memory 45. Table VI lists the values of the numbers that could be used to generate the timing signals.

Figure 6A:
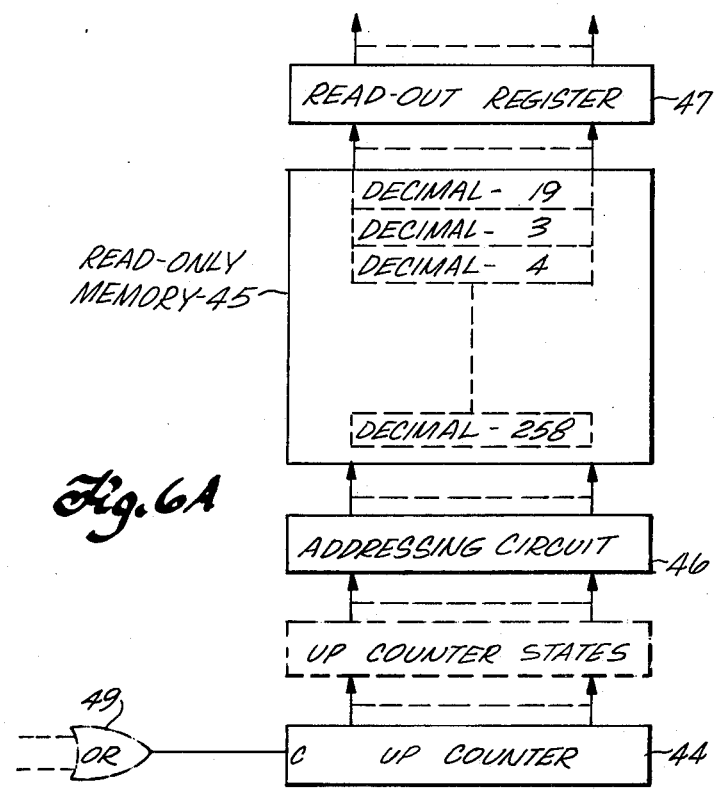
FIG. 6A is a schematic illustration of a portion of a microprocessor including the read-only memory employed in the logarithmic time base generator of FIG. 6.

The numbers are sequentially stored in the memory 45 and are read out in response to the incrementing of the up counter 44 which in turn responds to the output pulses generated by the down counter as diagrammatically illustrated in FIG. 6A. The preset numbers may be advantageously stored in the memory 45 in sequential relationship and in the same sequence in which they are to be read out into the read-out register 47. For example, the first three numbers from Table VI to be stored and set into the down counter 40 are the decimal numbers 19, 3 and 4. Accordingly, twenty-three such numbers are stored in the memory 45 wherein the last decimal digit corresponding to the count of 23 of the up counter is 258. The numbers are read out of the memory 45 by means of the addressing circuit 46. The addressing circuit 46 is defined to address the memory 45 in sequential relationship, when the memory sequentially stores the preset numbers, so that the circuit 46 provides the correct address in response to the output states of the up counter 44. Accordingly, it should be evident that when an output pulse is generated from the down counter 40 and thereby from the pulser 48, the up counter 44 will be incremented one count causing a new address to be entered at the circuit 46 for reading out the next successive preset number from the memory 45 into the register 47. With the application of a signal from the OR gate 49 at the PE terminal of the down counter 40 this number will be preset into the down counter 40 in preparation for the next timing signal to be generated.

The timing signals are generated through the application of the pulses from the source 41 to the down counter 40. For this purpose the pulses are applied to the down counter 40 under the control of the AND gate 42. Accordingly, the AND gate applies the pulse to the count input terminal for the down counter 40 in response to the start and stop pulses generated at the sequence control element 20 in response to the detection of the transitions between coding segments of different kinds. This is controlled through the setting and resetting of the start-stop flip flop 43. With every stop pulse generated at sequence control element 20, the stop pulse will cause the pulse to be counted from being applied to the down counter 40 as a result of setting the Q output to a low voltage condition. Upon the arrival of the sequential start pulse at the reset or R terminal of the flip flop 43, the Q output will be in a high voltage condition and the input conditions to the AND gate 42 are again satisified so that the pulses to be counted will be applied to the down counter 40. This counting continues until the next subsequent transition between coding segments is detected and the next successive stop pulse again sets the flip flop 43 so that the Q output of the flip flop 43 is set to a low voltage condition. As this counting process continues, the number of pulses applied to the down counter 40 will accumulate and the cumulative counts of the pulses $f_o$ that are applied to the down counter 40 to produce each one of the 23 time intervals N are identified in the third column of Table VI. It will be noted that since the preselected count that provides the output signal from the down counter 40 is from the −1 underflow terminal, that the output pulse will be generated when the number of pulses applied to the down counter 40 is equivalent to the preset number plus 1. Accordingly, the third column of Table VI, which is identified as the "cumulative counts" represents the total number of pulses from the source 41 that are applied to the counter 40 after the start pulse to the end of that coding segment or until the stop pulse is generated by detecting the next transition. By comparing Table VI with Table IV, it will be noted that the cumulative count at each count of the down counter 40 corresponds to the total number of microseconds between output pulses from the down counter divided by 10 due to the 10 microsecond intervals selected for the pulse repetition rate. Accordingly, with respect to count 23 or the twenty-third time interval in Table VI, 1,510 pulses will be applied to the counter 40 during this interval which takes 15,100 microseconds to occur. Similarly, with respect to count 22, 1,251 counts are applied during a time interval requiring 12,510 microseconds for this count. To the same end, the logarithmic expansion can be appreciated by examining the remaining counts and the corresponding preset numbers from Table VI.

The operation of the logarithmic time base generator 21 can now be summarized. It will be noted that when the up counter 44 is reset to count 0 in response to the start pulse produced in response to the detection of the leading edge of the first bar of a character, that the number read out from the memory 45 and which will reside in the counter 40 is the number 19. This first preset number is entered into the down counter 40 since the PE terminal of the counter 40 is activated due to the application of the start pulse to the OR gate 49 and thereby the PE terminal for the counter. Two hundred microseconds after the detection of the transition into the first coding segment, twenty pulses from the source 41 will have been applied to the down counter 40 so that after these 20 pulses have been applied an output signal will be generated at the −1 underflow terminal from the down counter 40. This first output pulse will be provided as the output from the clock pulser 48. With this output signal from the clock pulser 48 being applied to the OR gate 49, an output signal from the OR gate 49 will be produced for counting up the up counter 44 one count so as to cause the next preset number, the number 3, to be addressed at the memory read-out address circuit 46 and the number 3 is read out from the memory 45 into the output number register 47.

With the storage of the number 3 in the register 47 and the occurrence of the output pulse from the OR gate 49 at the PE terminal of the down counter 40, the number 3 will be preset into the down counter 40. With the setting of the down counter 40 to the decimal digit 3, after 4 pulses are applied to the down counter 40, it will underflow and a further output signal will be derived from the pulser 48 at the 240 microsecond interval, identified in Table IV as the time interval "1" under "N". This will again cause the up counter 44 to be counted up to two so that the next preset number is read out of the memory 45 and is subsequently preset into the down counter 40. The next preset number is 4, and after 5 pulses have been applied to the down counter 40 from the source 41, another output signal will be generated at the −1 overflow terminal of the pulser 48. This will occur at time interval two of Table IV. During the next time interval, the down counter 40 is preset to 5 and underflows after the sixth pulse is counted. The numbers are preset in the counter in sequence 6, 8, 10, 12, etc. and will underflow to generate an output signal each time the number of pulses plus one have been applied to the counter 40 after it has been preset with a number. The same sequencing action continues until a transition is detected signalling the end of one coding segment and the beginning of another. The detection of this transition will produce the necessary stop pulse which will set the start-stop flip flop 43 and prevent the application of pulses from the source 41 from being applied to the down counter 40. Accordingly, the number of signals that have been generated from the generator 21 during the time interval from a start pulse to the generation of a subsequent start pulse will be the logarithmic measurement of the width of the coding segment that has been scanned. With the generation of the new start pulses following the aforementioned stop pulse signifying the scanning of the next successive coding segment, the start pulse will reset the up counter 44 to its 0 state and in sequence a new preset number or the number 19 is set into the counter 40 for generating the next series of timing signals for measuring the width of the next segment of the recorded character scanned.

It should now be appreciated that the present invention advances the state of the art as to reading and decoding linear bar coded information including through the provision of a logarithmic time base generator. The invention comprehends the measurement of elapsed time with a logarithmically expanded time base and computing the ratios of the widths of bar coded segments by simple subtraction. The logarithmic time base is adapted to provide timing signals that are logarithmically related through the selection of a base of the logarithm for optimizing the resolution and efficiency for decoding the bar coded data within the constraints of the range and the number of selected width ratios. To this end, the implementation of the disclosed concept provides the capacity to cover the range of ratios required but not the total number of counts anticipated. When the implementation is in terms of a microprocessor, the commencement of the time base clock is delayed to reduce the required count capacity and provide time for the microprocessor to complete intermediate processing. The delaying of the commencement of the logarithmic time base generator is for a period equal to the shortest acceptable traversal time. This further permits decoding and reading of the bar coded data by the microprocessor rather than discrete logic having significant advantages in manually operated scanners employed with relatively slow, inexpensive microprocessors.

In the implementation of the computation of the width ratios, the present invention obviates the need for storage registers and subtractors and the need to sense overflow and underflow for the determination of sign through the utilization of up/down counters to perform this function.

In the advance of the art of logarithmic time base generators, the generator disclosed is directed to the optimization of the resolution and efficiency to provide a logarithmic base other than the base 2 for the generator. Any logarithmic base may be employed by continuously counting down a counter that is sequentially provided with a set of preselected numbers logarithmically related as to a selected logarithmic base for thereby providing the logarithmically related timing signals.

What is claimed is:

1. A digital-logarithmic timing signal generator for generating successive digital timing signals that are logarithmically related comprising a binary counter for counting down preselected numbers preset into the counter and providing output signals therefrom at the same preselected count thereby generating the successively logarithmically related digital timing signals, means coupled to the binary counter for responding to the output signals therefrom to enter a succession of preselected logarithmically related numbers into the binary counter, the preselected numbers being selected on the basis of any predetermined logarithmic base, other than the base two, so that the successive output signals and thereby the timing signals are logarithmically time related, and a pulse source coupled to the binary counter for counting down the binary counter to the preselected count, the pulses from said source being selected to occur at a continuous preselected rate.

2. A logarithmic timing signal generator for generating logarithmic timing signals wherein the successive timing signals are logarithmically expanded on the basis of any preselected logarithmic base, other than base 2, a binary counter for counting down a preselected number preset into the counter and providing an output signal therefrom at a preselected count, a source for continuously providing pulses to be counted occurring at preselected intervals, means for periodically applying the pulses from said source to the counter for counting down the counter, to provide output signals at a preselected count, means for storing binary coded numbers that are logarithmically related on the basis of said preselected logarithmic base, the numbers being transferred into the down counter being related on the basis of said logarithmic expansion whereby the output signals from the down counter occur at logarithmically related time intervals when the down counter is is counted down from the preset number plus one, and means for transferring the binary coded numbers from the storage means into the binary counter in response to the output signals from the binary counter.

3. A logarithmic timing signal generator as defined in claim 2 wherein the storage means comprises a read-only memory.

4. A logarithmic timing signal generator as defined in claim 2 including means for automatically starting and stopping the application of the pulses to be counted to the counter to thereby provide a logarithmic measurement.

5. A logarithmic timing signal generator as defined in claim 2 wherein the transferring means comprises a binary counter coupled to be responsive to the output signals from the count down binary counter for counting up the counter one count in response to each of the logarithmically related output signals from the count down binary counter, the output signals from the binary up counter being effective for sequentially selecting and transferring the numbers from the storage means into the binary down counter.

6. A logarithmic timing signal generator comprising
a first counter for counting up pulses applied thereto, and providing output signals representative of the count thereof a second counter for counting down a preset count recorded therein and providing an output timing signal upon being counted down to a preselected count, circuit means coupled to be responsive to the output timing signals from the second counter for applying a signal to the first counter for counting up the first counter, memory means for storing preset count valves to be entered into the second counter, the memory means being coupled to be responsive to the output signals of the first counter for sequentially reading out preselected count values and for presetting the count values into the second computer, and means for providing pulses at a fixed repetition rate for counting down the second counter to the preselected count for providing the logarithmically related timing signals from the thus defined signal generator.

7. A logarithmic timing signal generator for providing logarithmic time related signals comprising
means for storing a plurality of binary coded numbers, the numbers being stored in said means on the basis of their relationship in a logarithmic expansion based on a preselected logarithmic base, other than the base two, count down circuit means, address circuit means for reading out the numbers from the storage means in accordance with their sequential order in a sequential logarithmic expansion, means coupled to the count down circuit means for entering each binary coded number read out from the storage means in a parallel circuit relationship into the count down circuit means, means for providing pulses at a preselected repetition rate and being coupled to said count down circuit means for applying the pulses to be counted to the count down circuit means, the count down circuit means providing an output logarithmic time signal therefrom in response to being counted down from the number entered therein to a preselected count, the preselected count being the same irrespective of the number entered into the count down circuit means whereby the logarithmic time related signals are provided when the number of input pulses counted are equal to the entered number minus one, and means coupled to be responsive to each output signal from the count down circuit means for coupling a signal to said read-out means for reading out a new number from the storage means to be entered into the count down circuit means.

8. A logarithmic timing signal generator as defined in claim 7 wherein the storage means is a read-only memory.

9. A logarithmic timing signal generator as defined in claim 1 wherein the last mentioned means comprises count-up counter means for providing counts to said address circuit means to address and read out said memory, the count-up counter providing address signals in response to said output signals.

10. A method of electronically generating a digital logarithmic time base signal including the steps of
providing a count down counter, presetting a preselected count into the count down counter, the preselected count being selected on the basis of a preselected logarithmic base, other than the base two, counting down the down counter with pulses to be counted occurring at a preselected repetition rate to a preselected count and providing an output logarithmic timing signal upon arriving at the preselected count, automatically presetting the next preselected count into the down counter to be counted down by the pulses to be counted in response to the output signal derived at said preselected count, said next preselected count being selected upon the basis of the next successive logarithmic expansion of the preselected logarithmic base, and repeating the counting down of the down counter for providing the next successive timing signal upon arriving at said preselected count whereby successive output signals derived at said preselected count are logarithmically related.

11. a method of electronically generating a digital logarithmic time base signal as defined in claim 10 including the steps of automatically repeating the steps of presetting the counts into the down counter and counting down the counter for providing successive logarithmically related timing signals whereby the timing signals are produced when the number of pulses counted is equal to the present count plus one.

12. Apparatus for providing a logarithmic measurement of real time wherein the successive logarithmic-time output signals are related on the basis of any logarithmic base other than base 2, comprising binary counting means for counting down preselected numerical values preset into the counter and providing output signals therefrom at the same preselected count, means coupled to said binary counting means for storing preselected numerical values to be sequentially entered into the binary counting means and being responsive to the output signals from the counting means for sequentially entering the numerical values stored therein, the logarithmically related numerical values that are stored in said means and are sequentially preset into the counter are a value representing a preselected time delay for starting the generation of the logarithmic-time output signals along with the values 3, 4, 5, 6, 8, 10, 12, etc; said specific logarithmic values being related on the basis of a preselected logarithmic base, and a pulse source coupled to the binary counting means for counting down the counting means to said preselected count fo providing the logarithmic-time output signals therefrom, the pulses from said source being selected to occur at a preselected repetitive rate, the logarithmic-time output signals from the binary counting means being representative of the logarithmic time intervals 0, 1, 2, 3, etc. corresponding to counting down the sequence of said numerical values representing the preselected time delay and then the numerical values 3, 4, 5. etc.

13. Apparatus for providing a logarithmic measurement of real time as defined in claim 12 wherein said preselected count of the binary down counting means is the count (−1), minus one.

14. Apparatus for providing a logarithmic measurement of real time wherein the successive logarithmic time output signals are related on the basis of any logarithmic base other than the base 2, comprising binary counting means for counting down preselected numerical values preset into the counter and providing output signals therefrom at the same preselected count, an addressable storage means coupled to said binary counter for storing preselected numerical values to be sequentially entered into the binary counting means, the numerical values are stored in sequential addresses in the storage means and represent preselected logarithmically related numerical values on the order of the values 3, 4, 5, 6, 8, 10, 12, etc.;

a source of pulses to be counted coupled to the binary counting means for counting down the counter to said preselected count with the sequential entry of each of said logarithmically related numerical values in the counting means, the pulses from the source being selected to occur at a preselected pulse repetition rate, binary counting means for counting up pulses to be counted and for sequentially addressing the storage means in accordance with the sequence of counts generated by said counting means, and control circuit means coupled to be responsive to the output signals from the binary down counting means provided at said preselected count for coupling the output signals to the binary up counter for counting up said counting means to sequentially read out the values stored in the storage means and sequentially enter the readout values in the binary down counting means.

15. Apparatus for providing a logarithmic measurement of real time as defined in claim 14 wherein said storage means is a read-only memory means and the preselected count of the binary down counting means is the count (−1), minus one.

16. An electronic method for generating logarithmic timing signals representative of real time wherein the successive timing signals are related on the basis of any logarithmic base, other than the base 2, including the steps of providing a binary counter, counting pulses occurring at a preselected continuous rate with the binary counter for producing successive timing signals that are logarithmically related on the basis of the preselected logarithmic base, sequentially entering preselected binary coded numbers into the binary counter after the production of each timing signal from the counter, the values of the numbers that are entered into the binary counter being based on a logarithmic expansion for any one preselected logarithmic base whereby the logarithmic timing signals are produced when the pulses counted are equivalent to the value of the number entered into the binary counter plus one pluse, and delaying the generation of the logarithmic timing signals from the binary counter for a preselected fixed period of time.

17. An electronic method for providing logarithmic timing signals representative of real time wherein the successive signal are related on the basis of any preselected logarithmic base other than the base 2, including the steps of providing a binary down pulse counter for counting down preset values entered into the counter and providing output signals therefrom at the same preselected count when the counter is counted down to said preselected count, storing the logarithmically related numerical values 3, 4, 5, 6, 8, 10, 12 14, etc. in the recited sequential sequence, the logarithmic values being related on the basis of the preselected logarithmic base, sequentially entering the stored numerical values in the down counter, counting down the down counter to said preselected count after one of said numerical values has been entered therein; and entering the next sequential numerical value to be counted down after the counter has been counted down and signals the preselected count.

18. An electronic method for providing logarithmic timing signals representative of real time as defined in claim 17 wherein the lagarithmic time intervals are generated after a time delay corresponding to the time interval required to count down an initial numerical value and providing a logarithmic time output signal thereafter at each time interval required for sequentially counting down the values 3, 4, 5, 6, 8, etc.

19. An electronic method for providing logarithmic timing signals representative of real time as defined in claim 18 wherein said initial numerical value is on the order of the value 19.

20. An electronic method of generating digital signals that are logarithmically time related on the basis of any logarithmic base other than the base two, including the steps of providing a count down binary counting means and providing an output signal therefrom at a preselected count, providing a source of pulses to be counted, the pulses occurring at a preselected repetition rate, coupling the pulses to be counted to the count down binary counting means, providing a series of logarithmically related values to be sequentially entered into the count down counting means, the values being related on the basis of a preselected logarithmic base, other than the base 2, entering the first of the series of said values into the count down counting means, counting down the counter having said first value entered therein until the preselected count signal is produced, and sequentially entering the successive values in the count down counting means at the time the counter signals it has been counted down to the preselected count whereby the time periods between successive signals produced at the preselected count have the desired logarithmic relationship.

21. An electronic method for providing logarithmic timing signals representative of real time as defined in claim 20 including delaying the counting down of the counting means a preselected time interval equivalent to the time interval required for counting down said first value entered therein.

* * * * *

UNITED STATES PATENT OFFICE
CERTIFICATE OF CORRECTION

Patent No. 4,058,708      Dated November 15, 1977

Inventor(s) Paul Sherer et al.

It is certified that error appears in the above-identified patent and that said Letters Patent are hereby corrected as shown below:

Col. 7, line 48 (Application page 12, line 28) $J = 1/(SR/2)$ should read $$J = K^{\frac{1}{SR/2}}.$$

Col. 14, line 11, (Application page 27, line 11) "$B_1/B_2$" should be moved directly under "Translate" and "Hold" should be substituted therefor.

Col. 16, line 44, (Application page 32, line 16) change "counters" to --counts--

Col. 22, line 7 (Amendment dated 4/7/77, page 4, line 11), after "count" change "valves to --values--.

Col. 24, line 55, (Amendment dated 4/7/77, page 9, line 17) "pluse" should read --pulse--.

Signed and Sealed this

Second Day of May 1978

[SEAL]

Attest:

RUTH C. MASON
Attesting Officer

LUTRELLE F. PARKER
Acting Commissioner of Patents and Trademarks